April 22, 1958
W. T. NELSON
2,831,905
GAMMA-BUTYROLACTONE AS A SELECTIVE
SOLVENT FOR HYDROCARBONS
Filed April 9, 1956
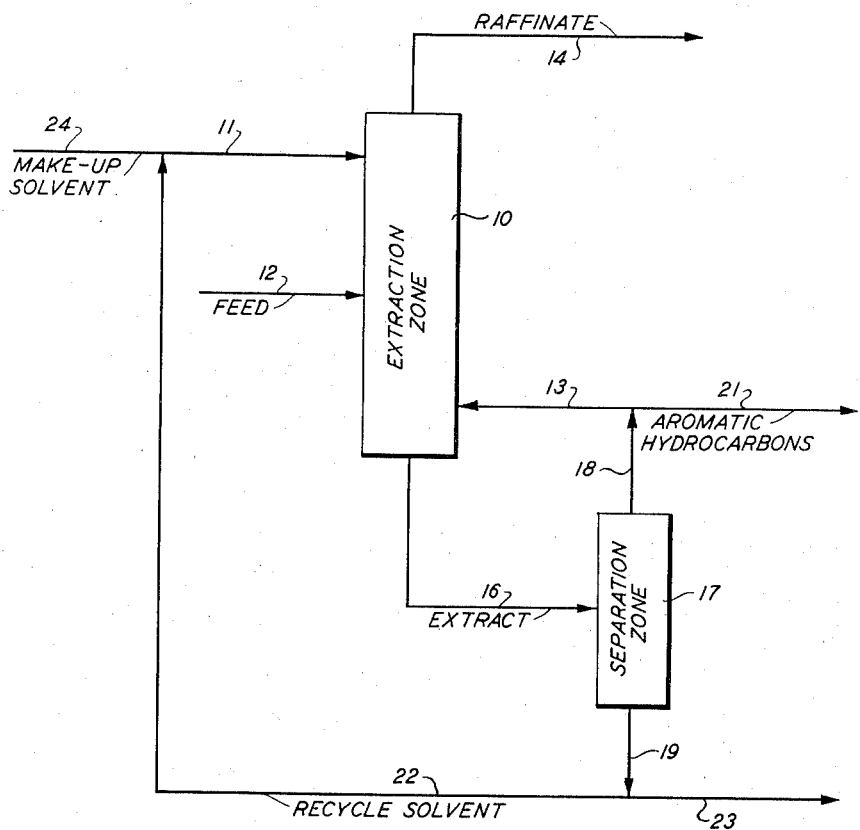
INVENTOR.
W. T. NELSON
BY
*Hudson and Young*
ATTORNEYS United States Patent Office 2,831,905
Patented Apr. 22, 1958

2,831,905

GAMMA-BUTYROLACTONE AS A SELECTIVE SOLVENT FOR HYDROCARBONS

William T. Nelson, Bartlesville, Okla., assignor to Phillips Petroleum Company, a corporation of Delaware Application April 9, 1956, Serial No. 577,150

9 Claims. (Cl. 260—666)

This invention relates to the separation of the components of a hydrocarbon mixture. In a further aspect, this invention relates to a selective solvent for separating mixtures of hydrocarbons into components of different physical and chemical properties, such as the separation of aromatic hydrocarbons from hydrocarbon mixtures containing the same and olefin, naphthene, and/or paraffin hydrocarbons. In another of its more specific aspects, this invention relates to solvent extraction and extractive distillation processes for separating components of hydrocarbon mixtures.

In the various processes of converting hydrocarbons there are frequently formed mixtures which contain some or all types of hydrocarbons such as paraffins, cycloparaffins, olefins, and aromatic hydrocarbons. Such mixtures can usually be separated by fractional distillation into close boiling fractions, but the further separation of such fractions to obtain reasonably pure hydrocarbons is very often difficult by conventional fractionation processes. Various methods have been proposed for effecting the separation of these hydrocarbons. Of these methods, the most practical from the viewpoint of large scale operation are those which involve contacting the mixture of hydrocarbons with a solvent which has a preferential solubility for one or more of the hydrocarbon components.

The following are objects of this invention:

An object of this invention is to provide a method for separating the components of a hydrocarbon mixture. A further object of this invention is to provide a method for separating aromatic hydrocarbons from a mixture containing the same and olefin, naphthene, and/or paraffin hydrocarbons; for the separation of olefins from a mixture containing naphthene and/or paraffin hydrocarbons; and for the separation of naphthenes from a mixture containing paraffin hydrocarbons. A further object of this invention is to provide a new selective solvent for the above-mentioned separation.

Other objects and advantages of this invention will be apparent to those skilled in the art.

Accompanying and forming a part of this application is a drawing illustrating one method of operation using the selective solvent of my invention.

In my application Serial No. 300,691, filed July 24, 1952, now abandoned, and Serial No. 565,925, filed February 16, 1956, now abandoned, I have disclosed that gamma-butylrolactone is an excellent solvent for the separation of aromatic and olefinic hydrocarbons from paraffins. By further work, I have discovered that this solvent is suitable for additional separations. This solvent is selective for hydrocarbons in the order aromatic, olefinic, naphthenic, and paraffinic and, broadly, can be used for separation of one or more higher in order from those below. More particularly, this solvent is selective for aromatics when in admixture with olefins, naphthenes, and/or paraffins. Furthermore, the solvent is selective for olefins when in admixture with naphthenes, and/or paraffins.

Gamma-butyrolactone has a boiling point of 204° C. and is an oil at room temperature. It has a melting point at —44° C. and is, therefore, useful over a very wide temperature range. The process of my invention comprises contacting the hydrocarbon mixture with gamma-butyrolactone, as a solvent, in an absorbent zone under such conditions of temperature and pressure that specific hydrocarbon components of the hydrocarbon mixture are dissolved in the solvent from which they can be recovered by subsequent treatment.

The attached drawing shows, in diagrammatic form, a solvent extraction process which I have found suitable in practicing my invention, this being the separation of aromatics from a hydrocarbon stream containing the same.

Directing attention to the drawing, the primary zone is the extraction zone 10 which is provided with solvent inlet conduit 11, feed inlet conduit 12, aromatic hydrocarbon recycle conduit 13, raffinate outlet conduit 14, and extract outlet conduit 16.

Extract conduit 16 extends into the central portion of separation zone 17, said zone 17 being provided with aromatic hydrocarbon outlet 18 and solvent outlet 19.

In the operation of this apparatus the feed is supplied to the central portion of extraction zone 10 and solvent is supplied to the upper portion of this zone by conduit 11. By means of suitable contacting appartus, such as bubble trays, Raschig rings, Burl saddles, and the like, the solvent dissolves the aromatic components of the feed. In order to insure effective extraction a portion of the aromatic hydrocarbons recovered in this process is introduced through line 13 into the lower portion of extraction zone 10. The non-aromatic fraction is removed as the raffinate being withdrawn from the upper portion of the extraction zone through conduit 14.

Solvent containing dissolved aromatics is passed from the lower end portion of extraction zone 10 to the central portion of separation zone 17. This separation may be carried out by any suitable method. For example, this separation zone may be a simple distillation column in which the aromatics are taken overhead and the solvent is removed from the lower part of the column. A portion of the aromatic hydrocarbons is removed through conduit 21. The major portion of the recovered solvent is recycled to the extraction zone through conduit 22, and a protion may be withdrawn through conduit 23. Makeup solvent is supplied by means of conduit 24.

It will be apparent to those skilled in the art that extractive distillation processes may also be employed using the solvent of my invention.

In order to illustrate one embodiment of my invention 50 volume percent of a mixture containing 50 percent benzene and 50 percent normal heptane was agitated about two minutes with 50 volume percent of gamma-butyrolactone at 24° C. and allowed to settle several minutes. The extract was drawn off. The results are shown in the following table.

| | Volume Percent | | | | |
|---|---|---|---|---|---|
| | Charge | Extract | Raffinate | K | $K_R$ |
| Percent of charge | 100 | 79 | 21 | | |
| Benzene | 25 | 27.4 | 16.2 | 1.69 | 12.6 |
| n-heptane | 25 | 10.6 | 79.0 | 0.134 | 1.00 |
| Solvent-gamma-butyrolactone | 50 | 62 | <4.8 | | |
| Temperature, 24° C. | | | | | |

Where $K$ = partition coefficient = $\dfrac{\text{concentration in extract}}{\text{concentration in raffinate}}$ and $K_R$ = partition coefficient relative to normal heptane.

In order to illustrate the effectiveness of separations which are made possible by the use of gamma-butyrolactone, I have determined the binary cloud point data for a mixture of 50 volume percent of gamma-butyrolactone and 50 volume percent of different hydrocarbons. The data are given in the following table.

| Solvent | Hydrocarbon | Cloud Point, ° C. |
| --- | --- | --- |
| γ-Butyrolactone | Benzene | Freezes at −23.3. |
| Do | 2-Heptene | About 100. |
| Do | Cyclohexane | 112. |
| Do | n-heptane | >121. |

The cloud point at 50–50 volume concentration, generally corresponds to the critical solution temperature. It is apparent from the figures in the above table that the solubility of the aromatic hydrocarbon and the olefin, naphthene, and paraffin hydrocarbons in gamma-butyrolactone are widely separated. In addition, the solubility of the olefin hydrocarbon and the naphthene or paraffin hydrocarbons in gamma-butyrolactone are also somewhat separated. Furthermore, the high boiling point of gamma-butyrolactone makes it readily separable from the hydrocarbons which it is desired to recover.

The following example illustrates an embodiment of my invention wherein a naphthene-paraffin separation is made. In this separation, a feed stream comprising equimolar quantities of normal heptane and cyclohexane is fed to a continuous countercurrent liquid-liquid extraction column at a rate of 1,518 gallons per hour, the column being operated at a temperature of 104.4° C. In order to produce a raffinate product comprising 95 mol percent normal heptane and an extract product comprising 99 mol percent cyclohexane, gamma-butyrolactone is introduced at the top of the column at a rate of 8,830 gallons per hour and the column is refluxed with a portion of the extract product at a reflux ratio of 6.72 to 1.

Hydrocarbon charging stocks or feed mixtures adapted to be processed in accordance with the present invention are of wide variety, obtainable from many different sources. In general, however, these are essentially complex liquid mixtures or solutions of hydrocarbons, both aromatic and non-aromatic, the latter usually including naphthenes and olefins in addition to paraffins. Examples of suitable stocks are gasolines, naphthas, burning oils, or similar fractions derived from crude petroleum. These fractions may be either straight run or cracked products or products of other refining operations such as reforming, particularly catalytic reforming. Aromatic hydrocarbons, as used herein, include benzene and derivatives thereof such as ethylbenzene, toluene, xylene, and the like, as well as polynuclear hydrocarbons. Olefins include hydrocarbons containing the carbon-to-carbon double bond liquid at the treating temperatures and pressures; the paraffins include the saturated aliphatic hydrocarbons liquid at the treating temperatures and pressures; and the naphthenes include the saturated cycloaliphatic hydrocarbons liquid at the treating temperatures and pressures.

Temperatures useful in the practice of this invention are dependent upon the particular components in the mixture to be separated. The lower temperature limit is the temperature at which freezing first occurs. In general, the extraction process is carried out at a temperature within the range of 20 to 80° C. However, higher temperatures can be used (110° C. and higher) provided the pressure is suitably adjusted. Also, the extraction step is ordinarily carried out at pressures greater than atmospheric to assure a liquid phase extraction step, but atmospheric pressures can also be used when the vapor pressure of the mixture being treated is less than one atmosphere.

The extraction process of the present invention can be carried out in various ways, the most common mode of operation comprising the use of a spray, packed, or bubble plate tower, wherein the hydrocarbon mixture is contacted by the stream of gamma-butyrolactone flowing therethrough, usually in counter-current relation to the mixture under treatment. If desired, the process can also be carried out by distilling the hydrocarbon mixture in the presence of gamma-butyrolactone as an extractive distillation process.

The gamma-butyrolactone used in the practice of my invention should be quite pure although the commercial product containing a very small amount of water can be used. This water should not amount to over a few percent because excessive amounts of water will result in the hydrolysis of the lactone giving the corresponding acid. The acid is not desired for the separations disclosed herein.

As many possible embodiments may be made of this invention without departing from the scope thereof, it is to be understood that all matter herein set forth or shown in the accompanying drawing is to be interpreted as illustrative and not in a limiting sense.

I claim:

1. In a process for the separation of one member selected from the group consisting of normally liquid aromatic, olefinic, naphthenic, and paraffinic hydrocarbons, from another member of this group by solvent extraction and extractive distillation processes at temperatures of at least 20° C., the step of treating the mixture with a selective solvent consisting essentially of gamma-butyrolactone.

2. In the separation of aromatic hydrocarbons from a normally liquid mixture of same and at least one of olefinic, naphthenic, and paraffinic hydrocarbons by solvent extraction and extractive distillation processes at temperatures of at least 20° C., the step of treating the mixture with a selective solvent consisting essentially of gamma-butyrolactone.

3. In the separation of olefinic hydrocarbons from a normally liquid mixture of same and at least one of naphthenic and paraffinic hydrocarbons by solvent extraction and extractive distillation processes at temperatures of at least 20° C., the step of treating the mixture with a selective solvent consisting essentially of gamma-butyrolactone.

4. In the separation of naphthenic hydrocarbons from a normally liquid mixture of same and paraffinic hydrocarbons by solvent extraction and extractive distillation processes at temperatures of at least 20° C., the step of treating the mixture with a selective solvent consisting essentially of gamma-butyrolactone.

5. A process for the separation of a mixture of normally liquid hydrocarbons containing at least two of aromatic, olefinic, naphthenic, and paraffinic hydrocarbons into components of different physical and chemical properties comprising introducing the hydrocarbon mixture into the central portion of a contacting zone operated at a temperature of at least 20° C.; introducing a selective solvent consisting essentially of gamma-butyrolactone into the upper portion of said zone; withdrawing the major portion of at least one of olefinic, naphthenic and paraffinic hydrocarbons from the upper end portion of said zone; withdrawing a mixture of gamma-butyrolactone and the major portion of at least one of aromatic, olefinic, and naphthenic hydrocarbons from the lower end portion of said zone; passing said last named mixture to a separation zone; separating gamma-butyrolactone from said last named mixture; passing at least a portion of said gamma-butyrolactone recovered in said separation zone to the upper end portion of said contacting zone; and withdrawing a stream rich in at least one of aromatic, olefinic, and naphthenic hydrocarbons from said separation zone.

6. The process of claim 5 wherein said gamma-butyrolactone is separated from said mixture of gamma-butyrolactone and at least one of aromatic, olefinic, and naphthenic hydrocarbons by distillation.

7. In the separation and recovery of compounds selected from the group consisting of benzene, ethylbenzene, toluene and xylene from mixtures of said compounds with normally liquid aliphatic and cycloaliphatic hydrocarbons by solvent extraction and extractive distillation processes at temperature of at least 20° C., the improvement comprising treating the mixture with a selective solvent consisting essentially of gamma-butyrolactone.

8. In the separation and recovery of benzene from a mixture of benzene and normal heptane, the step of treating said mixture with a selective solvent consisting essentially of gamma-butyrolactone.

9. In the separation and recovery of cyclohexane from a mixture of cyclohexane and normal heptane, the step of treating said mixture with a selective solvent consisting essentially of gamma-butyrolactone.

References Cited in the file of this patent

UNITED STATES PATENTS

| 2,063,680 | Isham | Dec. 8, 1936 |
| 2,738,860 | Lorenz et al. | Mar. 20, 1956 |

Notice of Adverse Decision in Interference

In Interference No. 91,948 involving Patent No. 2,831,905, W. T. Nelson, Gamma-butyrolactone as a selective solvent for hydrocarbons, final judgment adverse to the patentee was rendered Dec. 5, 1962, as to claim 4.

[*Official Gazette January 29, 1963.*]